United States Patent
Ma et al.

(10) Patent No.: US 12,502,905 B2
(45) Date of Patent: Dec. 23, 2025

(54) SECURE DOCUMENT AUTHENTICATION

(71) Applicant: THALES DIS FRANCE SAS, Meudon (FR)

(72) Inventors: Lan Ma, Singapore (SG); Juan-David Dugand, Aix en Provence (FR); Michel Beziat, Paris (FR); Lovro Persen, El Casar (ES); Renuka Chittimalla, La Ciotat (FR)

(73) Assignee: THALES DIS FRANCE SAS, Meudon (FR)

( * ) Notice: Subject to any disclaimer, the term of this patent is extended or adjusted under 35 U.S.C. 154(b) by 232 days.

(21) Appl. No.: 17/926,152

(22) PCT Filed: May 19, 2021

(86) PCT No.: PCT/EP2021/063382
§ 371 (c)(1),
(2) Date: Nov. 18, 2022

(87) PCT Pub. No.: WO2021/234050
PCT Pub. Date: Nov. 25, 2021

(65) Prior Publication Data
US 2023/0186666 A1 Jun. 15, 2023

(30) Foreign Application Priority Data
May 22, 2020 (EP) .................................. 20315254

(51) Int. Cl.
*B42D 25/23* (2014.01)
*G06V 10/10* (2022.01)
(Continued)

(52) U.S. Cl.
CPC ........... *B42D 25/23* (2014.10); *G06V 10/225* (2022.01); *G06V 10/23* (2022.01); *G06V 10/70* (2022.01);
(Continued)

(58) Field of Classification Search
CPC ...... B42D 25/23; G06V 10/225; G06V 10/23; G06V 10/70; G06V 10/82;
(Continued)

(56) References Cited

U.S. PATENT DOCUMENTS 7,194,105 B2 * 3/2007 Hersch .................... G07D 7/207
713/176
10,452,906 B1 * 10/2019 Mennie .................... G06V 10/96
(Continued)

OTHER PUBLICATIONS

A. Berenguel, O. R. Terrades, J. Lladós and C. Cañero, "E-Counterfeit: A Mobile-Server Platform for Document Counterfeit Detection," 2017 14th IAPR International Conference on Document Analysis and Recognition (ICDAR), Kyoto, Japan, 2017, pp. 15-20, doi: 10.1109/ICDAR.2017.390. (Year: 2017).*

(Continued)

*Primary Examiner* — Gregory A Morse
*Assistant Examiner* — Ronde Lee Miller

(57) ABSTRACT

The present invention relates to a method for authenticating a document comprising at least one line of anti-counterfeit patterns spaced from each other, the positions of the anti-counterfeit patterns being random, and a partial anti-counterfeit pattern being provided at an edge line of said document, the method comprising the following steps of:
receiving a digital image of said document, said digital image comprising said partial anti-counterfeit pattern in a first edge area corresponding to said edge line;
selecting said first edge area;
copy-pasting said first edge area adjacent to a second edge area of the digital image to generate a combined digital image, said second edge area being opposite to said first edge area, wherein content, which is comprised in said second edge area and located on the same line as said partial anti-counterfeit pattern, and said partial anti-counterfeit pattern jointly form a combined pattern;

(Continued)

authenticating said document by taking into account said combined pattern.

10 Claims, 3 Drawing Sheets

(51) Int. Cl.
    *G06V 10/22*     (2022.01)
    *G06V 10/24*     (2022.01)
    *G06V 10/70*     (2022.01)
    *G06V 10/82*     (2022.01)
    *G06V 30/19*     (2022.01)
    *G06V 30/224*     (2022.01)
    *G06V 30/40*     (2022.01)
    *G07D 7/00*     (2016.01)
    *G07D 7/12*     (2016.01)
    *G07D 7/20*     (2016.01)
    *G07D 7/202*     (2016.01)

(52) U.S. Cl.
CPC ........ *G06V 10/82* (2022.01); *G06V 30/19173* (2022.01); *G06V 30/224* (2022.01); *G06V 30/40* (2022.01); *G06V 10/16* (2022.01); *G06V 10/245* (2022.01)

(58) Field of Classification Search
CPC ........... G06V 30/19173; G06V 30/224; G06V 30/40; G06V 10/16; G06V 10/245
See application file for complete search history.

(56) References Cited

U.S. PATENT DOCUMENTS

| | | | | |
|---|---|---|---|---|
| 10,475,270 | B2* | 11/2019 | Phillips | G07D 7/121 |
| 11,341,801 | B2* | 5/2022 | Pechinko | G06V 20/52 |
| 2004/0076310 | A1* | 4/2004 | Hersch | G07D 7/0032 |
| | | | | 382/100 |
| 2013/0169677 | A1* | 7/2013 | Rosset | B42D 25/351 |
| | | | | 345/629 |
| 2020/0143162 | A1* | 5/2020 | Zheng | G07D 7/0034 |
| 2021/0312745 | A1* | 10/2021 | Edgar | G06N 20/00 |
| 2023/0186666 | A1* | 6/2023 | Ma | G07D 7/20 |
| | | | | 382/115 |
| 2023/0196862 | A1* | 6/2023 | Arora | G06T 7/194 |
| | | | | 705/317 |
| 2024/0250832 | A1* | 7/2024 | Fraser | G07D 7/0043 |

OTHER PUBLICATIONS

International Search Report (PCT/ISA/210) and Written Opinion (PCT/ISA/237) mailed on Jul. 23, 2021 by the European Patent Office as the International Searching Authority for International Application No. PCT/EP2021/063382—[13 pages].

* cited by examiner

SECURE DOCUMENT AUTHENTICATION

TECHNICAL FIELD

The present invention relates generally to authentication of secure documents, and more particularly to a computer-implemented method for authenticating secure documents in an accurate manner.

BACKGROUND

Physical secure documents or documents of value, such as official identity documents (e.g., identity card, passport, driver's license, fishing license, hunting license, health insurance card, firearm owner's identification card, boating license, commercial driver's license, etc.), are used since the beginning to guaranty that the person presenting the document is the associated person referenced in the document. The verification is done by a verifier that often knows which security patterns to check.

In the Internet era, new web services are becoming more and more popular, as they allow users to enroll or use a service in a convenient way without physical presence. Some web services need to authenticate secure documents held by end users in order to permit them to access the services. To this end, the end users often send a photo of the required document to service providers' systems for on-line or off-line verification.

As there is no human physical control, the end users can attack the systems with fake secure documents. To address this problem, the systems usually check anti-counterfeit patterns (or security patterns, marks) that shall be included (e.g., printed, marked) in the physical secure documents in order to detect fake documents.

Today, one type of anti-counterfeit patterns used in secure documents are a plurality of Optical Variable Ink (or OVI) patterns (e.g., images, characters, numbers, letters, etc.) regularly printed from an edge of the document to the opposite edge of the document. Hologram patterns and other types of anti-counterfeit patterns may also be used in the invention. The positions of the patterns of the document are randomly generated during the manufacturing process. For example, two lines of "RF" (the character "R" has only the right part, which is normally designed) patterns are repeatedly provided in a French identity card from one boarder to the opposite boarder of the card. The "RF" patters are randomly positioned on the card, different cards having the "RF" patterns with different locations.

The current solution for authenticating secure documents having such anti-counterfeit patterns is based on detecting an anti-counterfeit pattern(s) located at an edge(s) of a digital copy (e.g., photo, scanned image) of a document to be a legitimate (or real) anti-counterfeit pattern(s). However, this solution is not satisfactory, because it often fails to detect some patterns due to document fatigue, and/or due to deformation, random positions of the patterns introduced during the manufacturing process of the secure documents. As a result, the current solution has an unsatisfactory authentication success rate (e.g., bad alerts) which greatly affects the accuracy and efficiency of the document authentication. FIG. 1A illustrates an example of a French identity card with a plurality of "RF" anti-counterfeit patterns in the prior art. FIG. 1B illustrates an example of a legitimate (or real) anti-counterfeit pattern (partial "R" on the first line) located at the right edge of a digital copy of a French identity card, which the current solution fails to detect. The failure is caused by the fact that the partial "R" is deformed during the document fabrication. FIG. 1C illustrates another example of a legitimate (or real) anti-counterfeit pattern (partial "R" on the second line) which the current solution fails to detect. The failure is caused by the fact that the partial "R" is too partial and illegible. It should be noted that the principles of the present invention are not to be limited in scope to French identity card or the anti-counterfeit patterns used in French identity cards. The principles of the present invention are to include any type of security document regardless of the type of security document.

SUMMARY

In order to solve the above mentioned technical problem, the present invention provides an enhanced method for authenticating secure documents in a more accurate and efficient manner.

In a particular embodiment of the present invention, there is a method for authenticating a document comprising at least one line of anti-counterfeit patterns spaced from each other, the positions of the anti-counterfeit patterns being random, and a partial anti-counterfeit pattern being provided at an edge line of the document, the method comprising the following steps of:
  receiving a digital image of the document, the digital image comprising the partial anti-counterfeit pattern in a first edge area corresponding to the edge line;
  selecting the first edge area;
  copy-pasting the first edge area adjacent to a second edge area of the digital image to generate a combined digital image, the second edge area being opposite to the first edge area, wherein content, which is comprised in the second edge area and located on the same line as the partial anti-counterfeit pattern, and the partial anti-counterfeit pattern jointly form a combined pattern;
  authenticating the document by taking into account the combined pattern;
  authenticating the document by taking into account the combined pattern.

In a particular embodiment of the present invention, the method further comprises the following steps of:
  applying a deep learning trained model to the combined digital image to detect real anti-counterfeit patterns from the combined pattern and the other anti-counterfeit patterns present on the combined digital image;
  authenticating the document to be real based on the detected real anti-counterfeit patterns.

In a particular embodiment of the present invention, wherein the deep learning model is a You Look Once model.

In a particular embodiment of the present invention, wherein the deep learning model is configured to perform the detection only once.

In a particular embodiment of the present invention, wherein the deep learning model is trained by using multiple combined digital images of documents with a fault tolerance In a particular embodiment of the present invention, the method further comprises the following steps of:
  detecting four classes of anti-counterfeit patterns: complete anti-counterfeit pattern, partial anti-counterfeit pattern, real combined pattern, false combined pattern;
  authenticating the document to be real based on the number of the real anti-counterfeit patterns.

In a particular embodiment of the present invention, if the document is real, the partial anti-counterfeit pattern provided at the edge line is adapted to combine with a partial anti-counterfeit pattern provided at an opposite edge of the document to jointly form a complete anti-counterfeit pattern.

In a particular embodiment of the present invention, the method further comprises verifying other data than the anti-counterfeit patterns on the digital image to provide a complete security check service.

In a particular embodiment of the present invention, there is a computer program comprising instructions for executing the steps of a method for authenticating a document comprising at least one line of anti-counterfeit patterns according to the invention when the program is executed by a processor.

In a particular embodiment of the present invention, there is a system for authenticating a document comprising at least one line of anti-counterfeit patterns spaced from each other, the positions of the anti-counterfeit patterns being random, and a partial anti-counterfeit pattern being provided at an edge line of the document, the system comprising:

- a memory unit for storing a computer program for authenticating a document comprising at least one line of anti-counterfeit patterns according to the invention; and
- a processor coupled to the memory unit, where the processor is configured to execute the program instructions of the computer program.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

The advantages and features of the system and the computer program according to the embodiments of the present invention are the same with those of the above described method and will not be repeated here.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this description, illustrate embodiments consistent with the invention and, together with the description, serve to explain the principles of the invention.

Figure 1A:
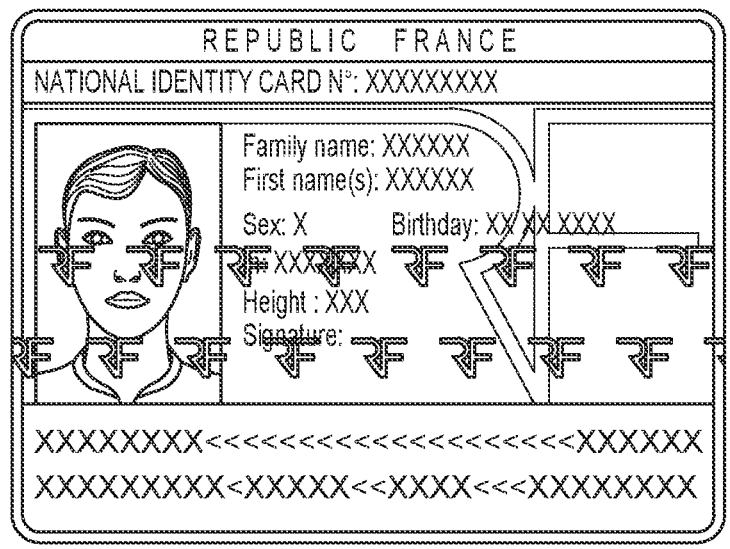
FIG. 1A illustrates an example of a document with a plurality of anti-counterfeit patterns in the prior art.
Figure 1B:
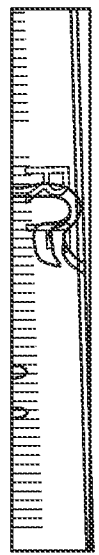
FIG. 1B illustrates an example of a real anti-counterfeit pattern located at an edge line of a document in the prior art.
Figure 1C:
FIG. 1C illustrates another example of a real anti-counterfeit pattern located at an edge line of a document in the prior art.

Specific embodiments in this invention have been shown by way of example in the foregoing drawings and are hereinafter described in detail. The figures and written description are not intended to limit the scope of the inventive concepts in any manner. Rather, they are provided to illustrate the inventive concepts to a person skilled in the art by reference to particular embodiments.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

The present invention comprises a method, system and computer program product for authenticating a document. A "document," as used herein, refers to a document comprising a plurality of anti-counterfeit patterns, for example, OVI patterns such as images, characters, numbers, letters, etc. The "plurality of anti-counterfeit patterns," as used herein, refers to one or more lines (or sequences) of anti-counterfeit patterns (e.g., substantially linearly arranged) which are spaced from each other (e.g., spaced at the same interval or different intervals). The anti-counterfeit patterns are randomly positioned (or located) on the document (e.g., the positions of anti-counterfeit patterns on different documents of the same type are different). The plurality of anti-counterfeit patterns present on the document may include one or more partial anti-counterfeit patterns (e.g., only a part of one complete pattern) and one or more complete anti-counterfeit patterns. At least one partial anti-counterfeit pattern may be provided at an edge line of the document (e.g., the partial anti-counterfeit pattern touches the edge line). Further, a system, referred to herein as a "document authentication system," receives a digital image (e.g., a digital photo copy, a digital scanned copy) of the document. The digital image comprises the partial anti-counterfeit pattern in an edge area corresponding to the edge line (e.g., a border of the document beginning from the edge line), this edge area being called herein "a first edge area".

After receiving the digital image of the document, the system selects the first edge area (which will be further discussed hereinafter). The system copy-pastes the selected first edge area adjacent to a second edge area (e.g., an opposite border) of the digital image to generate a combined digital image. The second edge area is opposite to the first edge area (e.g., a right edge opposite to a left edge and vice versa, an upper border opposite to a bottom border and vice versa). The first edge area is copy-pasted adjacent to (or combined with) the second edge area so that the partial anti-counterfeit pattern comprised in the first edge area and content (e.g., a partial anti-counterfeit pattern, a complete anti-counterfeit pattern, blank space) comprised in the second edge area jointly form a combined pattern. The content used to form the combined pattern is located at the same line as that partial anti-counterfeit pattern in the first edge area. In other words, for example, if there are two lines of anti-counterfeit patterns and if a partial anti-counterfeit pattern of the first line is provided at the first edge area, after combining the first edge area and the second area, the partial anti-counterfeit pattern is combined with content located on the first line and in the second area to form the combined pattern.

Then, the system authenticates whether the document is real (or legitimate) by taking into account the combined pattern formed from the combination of the partial anti-counterfeit pattern of the first edge area and the content of the second edge area.

With the present invention, the partial anti-counterfeit pattern(s) located on the border (or edge area) of the document are checked together with additional effective information, i.e., the content(s) (e.g., a partial anti-counterfeit pattern, a complete anti-counterfeit pattern, blank space) located on the opposite border of the document. Indeed, the inventors found the use of this additional effective information because they found that when the real document is manufactured a partial anti-counterfeit pattern provided at an edge of the document is made to be able to combine with another partial anti-counterfeit pattern provided at the opposite edge to form a complete anti-counterfeit pattern. However, this is not found and utilized in the document authentication in the prior art. As mentioned before, the solution used in the prior art checks the partial anti-counterfeit pattern(s) individually. Due to the random position(s) of the partial anti-counterfeit pattern(s) or due to the deformation of the partial anti-counterfeit pattern(s) introduced by the normal manufacturing process, the partial anti-counterfeit pattern(s) often lacks sufficient information (e.g., too partial) or contains altered information (e.g., deformed by pressing or embossing). As a result, the solution of the prior art has a low accuracy and produces a lot of bad alerts. The present invention solves this problem in a simply and cost-efficient manner.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 2:
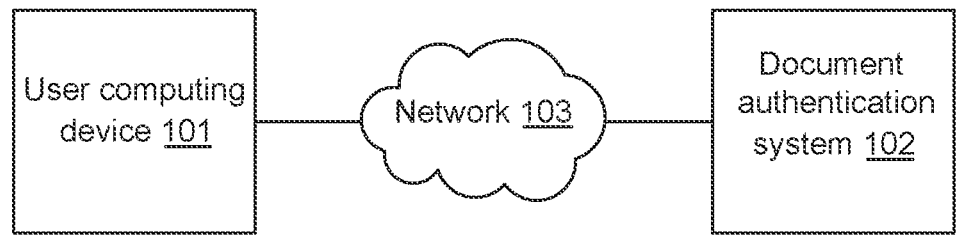
FIG. 2 illustrates a system for authenticating a document comprising at least one line of anti-counterfeit patterns in accordance with an embodiment of the present invention.

Referring now to the Figures in detail, FIG. 2 illustrates a system 100 for authenticating a document comprising a plurality of anti-counterfeit patterns in accordance with an embodiment of the present invention.

As illustrated in FIG. 2, system 100 includes a user computing device 101 (the user's computing device as well as the user himself/herself may each be identified with element number 101) connected to a document authentication system 102 via a network 103. Computing device 101 may be any type of computing device (e.g., portable computing unit, Personal Digital Assistant (PDA), smartphone, laptop computer, mobile phone, navigation device, game console, desktop computer system, workstation, Internet appliance and the like) configured with the capability of connecting to network 103 and consequently communicating with document authentication system 102 as discussed herein.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 2 without departing from the scope of the present invention.

System 100 further includes a document authentication system 102 (the document authentication system as well as a service provider of the document authentication may each be identified with element number 102). Document authentication system 102 is configured to receive a digital image of a document comprising anti-counterfeit patterns sent by user 101, for authenticating the document. It should be noted that in an alternative example, the document authentication system 102 may be a local standalone system (e.g., portable personal computer, mobile phone) which is adapted to receive the digital image from user in the proximity of the document authentication system 102 wiredly (e.g., via a cable, USB, etc.) or wirelessly (e.g., using Short-range wireless technologies such as Bluetooth, Bluetooth Low Energy (BLE), Wi-Fi, near-field communication (NFC), ultra-wideband (UWB), IEEE 802.15.4).

Document authentication system 102 is configured to select a first edge area of the digital image. The first edge area comprises a partial anti-counterfeit pattern which is located at an edge line of the document. Document authentication system 102 is adapted to copy-paste the selected first edge area adjacent to a second edge area of the digital image to generate a combined digital image. The second edge area is opposite to the first edge area. The first edge area is copy-pasted adjacent to a second edge area so that the partial anti-counterfeit pattern comprised in the first edge area combines with content comprised in the second edge area and located on the same line as the partial anti-counterfeit pattern to jointly form a combined pattern. Document authentication system 102 is configured to authenticate the document at least based on the combined pattern.

These and other features of document authentication system 102 will be discussed further below. In an example, document authentication system 102 provides the services of authenticating documents with anti-counterfeit patterns requested by user 101 as a cloud service. The authentication process may be, alternatively, performed in a virtual machine (or VM). A hardware configuration of document authentication system 102 is discussed below in connection with FIG. 3.

System 100 is not to be limited in scope to any one particular network architecture. System 100 may include any number of user computing devices 102, document authentication systems 102, and networks 103.

Figure 3:
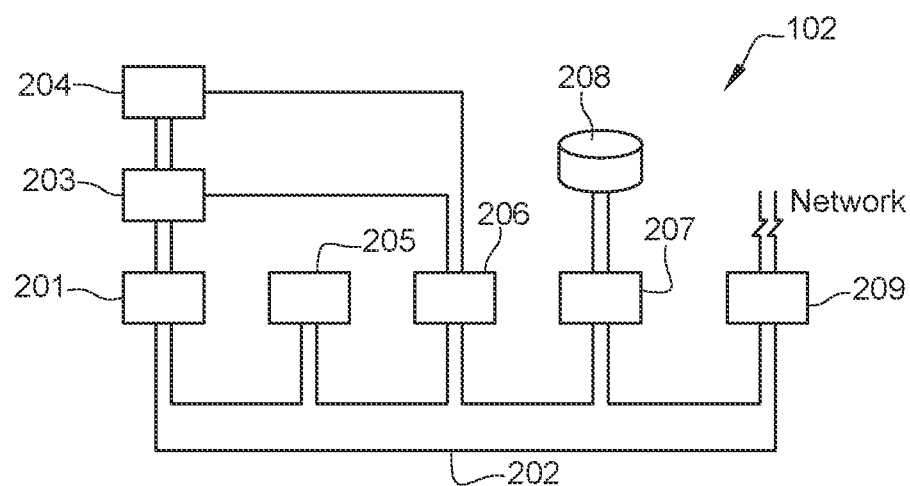
FIG. 3 represents a hardware configuration of a system of practicing the principles of the present invention in accordance with an embodiment of the present invention.

Referring now to FIG. 3, FIG. 3 illustrates a hardware configuration of document authentication system 102 (FIG. 2) which is representative of a hardware environment for practicing the present invention. Referring to FIG. 3, document authentication system 102 has a processor 201 coupled to various other components by system bus 202. An operating system 203 runs on processor 201 and provides control and coordinates the functions of the various components of FIG. 3. An application 204 in accordance with the principles of the present invention runs in conjunction with operating system 203 and provides calls to operating system 203 where the calls implement the various functions or services to be performed by application 204. Application 204 may include, for example, a program for authenticating a document comprising at least one line of anti-counterfeit patterns as discussed below in connection with FIG. 4.

Referring again to FIG. 3, read-only memory ("ROM") 205 is coupled to system bus 202 and includes a basic input/output system ("BIOS") that controls certain basic functions of document authentication system 103. Random access memory ("RAM") 206 and disk adapter 207 are also coupled to system bus 202. It should be noted that software components including operating system 203 and application 204 may be loaded into RAM 206, which may be document authentication system's 103 main memory for execution. Disk adapter 207 may be an integrated drive electronics ("IDE") adapter that communicates with a disk unit 208, e.g., disk drive. It is noted that the program for authenticating a document comprising a plurality of anti-counterfeit patterns, as discussed below in connection with FIG. 3 may reside in disk unit 208 or in application 204.

Document authentication system 102 may further include a communications adapter 209 coupled to bus 202. Communications adapter 209 interconnects bus 202 with an outside network (e.g., network 103 of FIG. 2) thereby enabling document authentication system 102 to communicate with other devices (e.g., user computing device 101 of FIG. 2).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
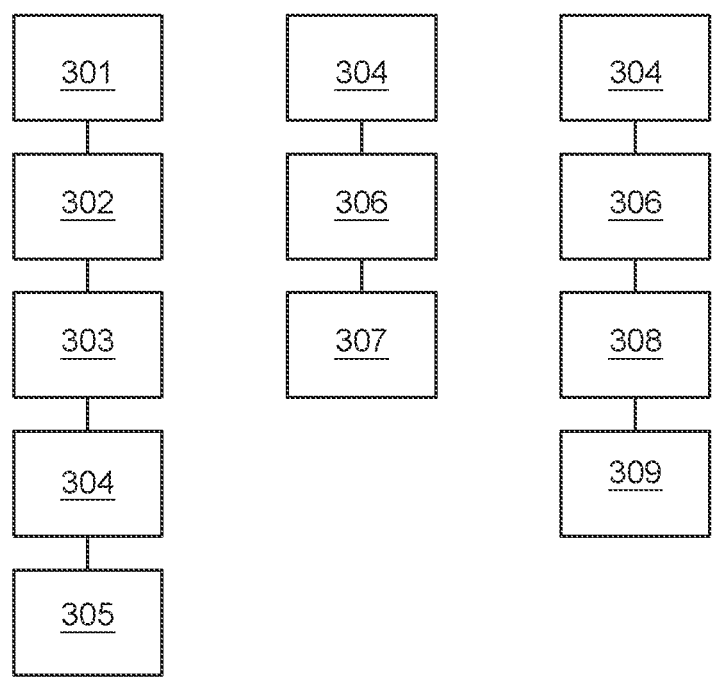
FIG. 4 illustrates a flowchart of a method for authenticating a document comprising at least one line of anti-counterfeit patterns in accordance with an embodiment of the present invention.

As stated above, FIG. 4 is a flowchart of a method 300 for authenticating a document comprising one or more lines of anti-counterfeit patterns in accordance with an embodiment of the present invention.

Figure 5A:
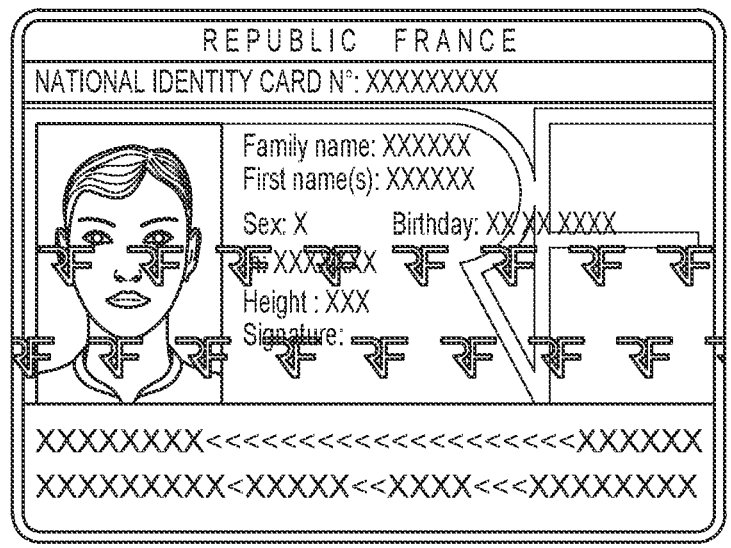
FIG. 5A illustrates an example of a digital image of a document with a plurality of anti-counterfeit patterns in accordance with an embodiment of the present invention.

Referring to FIG. 4, in conjunction with FIGS. 2-3, in step 301, document authentication system 102 receives a digital image (e.g., a digital photo copy, a digital scanned copy) of a document comprising one or more lines of anti-counterfeit patterns for example from user computing device 101. The receiving of the digital image may be interpreted as a request for authenticating the document. FIG. 5A shows an example of a digital image received by document authentication system 102. As depicted in this example, two lines of anti-counterfeit patterns (an "RF" character combination as a complete anti-counterfeit pattern) are present on the digital image of the document. The anti-counterfeit patterns are spaced from each other. The plurality of anti-counterfeit patterns present on the document include a partial anti-counterfeit pattern and several complete anti-counterfeit patterns. The partial anti-counterfeit pattern is provided at a left edge line of the document (e.g., the partial anti-counterfeit pattern touches the left edge line). Correspondingly, the received digital image comprises a left edge area (left border) comprising the partial counterfeit pattern. This left edge area is called "a first edge area".

The skilled person in the art shall easily appreciate that the present invention is not limited to the particular form ("RF"), the particular arrangement (two lines provided between the left and right edges) of the anti-counterfeit patterns, and the particular type of the document (French identity card) as illustrated in the example of FIG. 5A. The present invention may cover other forms and arrangements of anti-counterfeit patterns and other types of documents than the example of FIG. 5A as long as the documents are designed to have partial anti-counterfeit patterns provided at edges of the documents configured to be able to combine with partial anti-counterfeit patterns provided at the opposite edges to form complete anti-counterfeit patterns.

In step 302, document authentication system 102 may normalize the received digital image. For example, different dimensions of the received digital images may be normalized to a unified size. A predetermined image size (e.g., length of X pixels*width of Y pixels, etc.) could be defined for a particular type of document. The backgrounds of the received digital images may be removed by using a known image processing technology in order to filter useless information. Step 302 is an optional step which enhances the efficiency of the authentication process.

In step 303, document authentication system 102 selects the first edge area (e.g., left border) of the digital image, the first edge area comprising the partial anti-counterfeit pattern. The width of the first edge area may be determined according to the width of a complete anti-counterfeit pattern provided on the document, the width of the digital image, and the width of the document. For example, if the document has a width of X mm, a complete anti-counterfeit pattern provided on the document has a width of Y mm, and the digital image has a width of Z pixels, then the width of the first edge area may be determined to be Y*(Z/X) pixels. This is only one example to explain how we select the first edge area, but not intended to limit the invention. The skilled person shall appreciate that there are alternative methods to implement step 303.

Figure 5B:
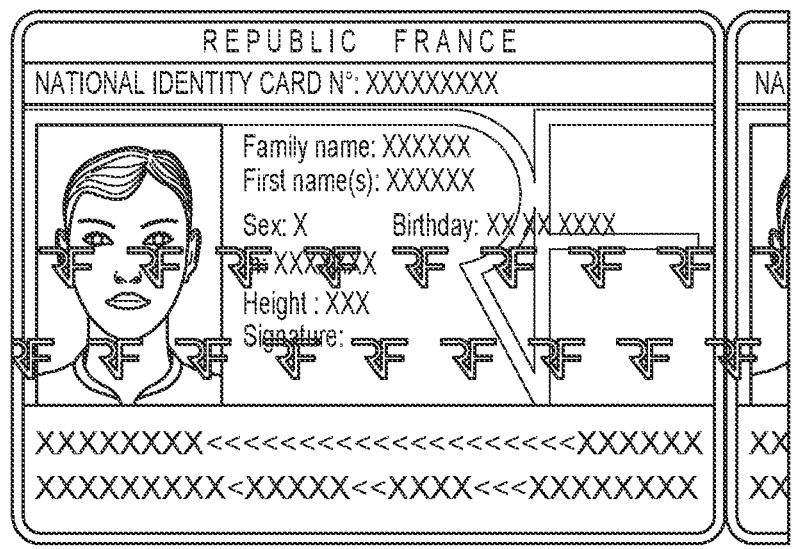
FIG. 5B illustrates an example of a combined digital image wherein the left edge area is combined with the right edge area of the original digital image of FIG. 5A in accordance with an embodiment of the present invention.

In step 304, document authentication system 102 copy-pasts the first edge area (e.g., left border) adjacent to an opposite edge (e.g., right border, called "second edge area") of the digital image to generate a combined digital image. In other words, document authentication system 102 makes a copy of the first edge area comprising the partial anti-counterfeit pattern and moves the copy to be adjacent to the opposite edge of the digital image. The copy of the first edge area thus combines with the original digital image along the opposite edge to form the combined digital image. The combination aims to generate additional effective information, i.e., a combined pattern, which is to be used in the following authentication. The combined pattern is generated from the partial anti-counterfeit pattern comprised in the first edge area and the adjacent content comprised in the second edge area and located in the same line as the partial anti-counterfeit pattern. FIG. 5B illustrates an example of the combined digital image generated in step 304. As can be seen in the exemplary combined digital image, the partial anti-counterfeit pattern originally comprised in the left border (first edge area) now combines with content (another partial anti-counterfeit pattern) comprised in the right border (right edge area) to form a combined pattern (a complete anti-counterfeit pattern as shown in the example of FIG. 5B). The content is on the same line as the partial anti-counterfeit pattern of the left border. It should be noted that the invention is not limited to FIG. 5B as the content of the second edge area may not limited to a partial anti-counterfeit pattern, but include any other contents. The combined pattern may have other forms than the complete anti-counterfeit pattern as illustrated in FIG. 5B.

In step 305, document authentication system 102 authenticates the document to be a legitimate (or real) document by taking into account the additional effective information, i.e., the combined pattern, which is generated in step 304. In other words, document authentication system 102 checks the partial anti-counterfeit pattern of the first edge area jointly with supplement information, i.e., the content of the second edge area, in order to authenticate the document in a more accurate manner. With the present invention, the authentication success rate is enhanced up to 94% compared with the current solution used in the prior art. Bad alerts (wherein real documents are alerted as false documents) are greatly decreased by using the present invention.

Additionally or alternatively, in step 306, document authentication system 102 applies a deep learning trained model to the combined digital image. This model may include, but not limited to, a YOLO (You Look Only Once) Object Detection Model of Convolutional Neural Network (or CNN). This model is originally designed to detect objects in real life like animals, human, tools, and plants. The inventors have modified training dataset (e.g., using a set of digital images of real documents and fake documents) to train the model to learn differences between real anti-counterfeit patterns and fake anti-counterfeit patterns. Thus, it is the first time that YOLO model is utilized in the application of document authentication. YOLO model is lightweight and fast, and capable of detecting objects in real time. Thus, the utilization of this model may reduce authentication delay for a user. This is especially advantageous in the application of on-line document authentication service. Further, the YOLO model is also suitable to integrate to mobile communication devices (e.g., mobile phones) while keeping a high performance, which enables the invention to be implemented in mobile communication devices. Further, YOLO model is originally designed to detect objects on an image for several times (e.g., six times) to find as many objects as possible. The invention modifies the YOLO model by reducing the number of detection times to only once (i.e., one time). This modification adapts the YOLO model to the particular application of document authentication as the objects to be detected in the document authentication are simple and similar anti-counterfeit patterns. By reducing the number of detection times to only once, the invention provides a further faster authentication solution which still keeps the accuracy. It is however to be noted that the invention may alternatively use other deep learning approaches and machine learning approaches.

A "real" or "legitimate" anti-counterfeit pattern, as used herein, refers to an anti-counterfeit pattern (either partial or complete) having the same shape as the corresponding anti-counterfeit pattern (the one at the same location) of a real document. To the contrary, a "false" anti-counterfeit patter, as used herein, refers to an anti-counterfeit pattern (either partial or complete) of which the shape is inconsistent with the shape of the corresponding anti-counterfeit pattern (the one at the same location) of a real document. Document authentication system 102 then authenticates, in step 307, the document to be real or not based on the detected real anti-counterfeit patterns. This embodiment enables to utilize further more additional effective information, that is, not only the combined pattern but also the other anti-counterfeit patterns provided on the combined digital image, in the authentication. Thanks to this solution, the reliability of the authentication result is further improved. For example, this solution may defect fake documents comprising real partial anti-counterfeit patterns located on edges and false anti-counterfeit patterns located on other positions.

Figure 5C:
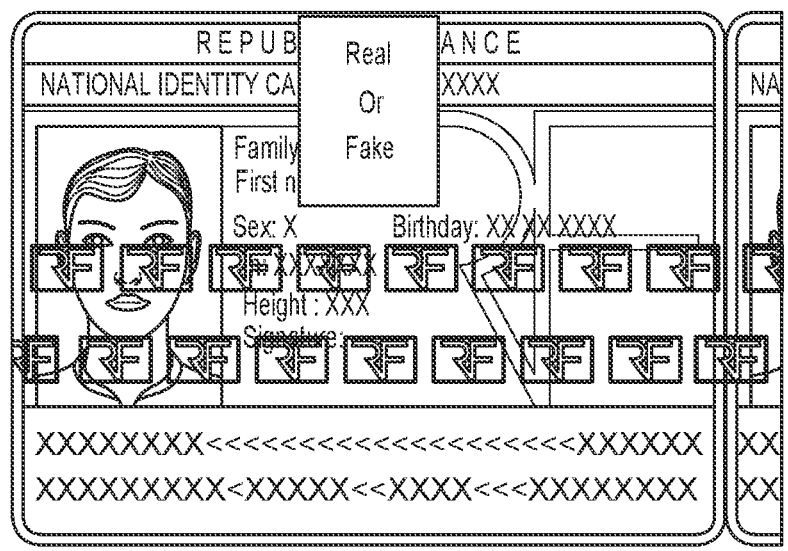
FIG. 5C illustrates an example of the combined digital image of FIG. 5B on which a combined pattern and the other anti-counterfeit patterns are detected in accordance with an embodiment of the present invention.

Additionally or alternatively, in step 308, document authentication system 102 detects four classes of anti-counterfeit patterns: complete anti-counterfeit pattern, partial anti-counterfeit pattern, real combined pattern, false combined pattern. As shown in FIG. 5C, document authentication system 102 detects several complete anti-counterfeit patterns, two partial anti-counterfeit patterns, and a real combined pattern. A "real combined pattern", as used herein, refers to a combined pattern having the shape of a complete anti-counterfeit pattern. To the contrary, a "false combined pattern", as used herein, refers to a combined pattern of which the shape is inconsistent with the shape of a complete anti-counterfeit pattern. Document authentication system 102 then authenticates, in step 309, the document to be real based on the number of the complete anti-counterfeit patterns, the real combined pattern, and the false combined pattern. For example, if it is detected that there are X complete anti-counterfeit patterns, Y real combined pattern, and Z false combined pattern, document authentication system 102 may compare X, Y, Z with predetermined thresholds (e.g., $X \geq 18$, $Y \geq 1$, $Z \leq 0$ as an authentication rule for French Identity cards) respectively. Based on the comparison result, the document may be authenticated to be real or not. In this embodiment, the authentication relies on the complete anti-counterfeit patterns and the combined pattern having the shape of a complete anti-counterfeit pattern, since these patterns contain more effective information compared with the partial anti-counterfeit patterns, which have less effective information or even confusing information and thus are not counted in the authentication step. This embodiment thus allows to maximize the accuracy of the authentication and avoid bad alerts.

Additionally or alternatively, the machine learning model is trained with multiple combined digital image samples of documents. The training may be realized with known methods like manually or automatically labeling real anti-counterfeit patterns and fake anti-counterfeit patterns on the samples. At least some of the combined digital image samples are generated with a fault tolerance. In other words, for some digital image samples, the first edge area may be copy-pasted to the second edge area in a non-aligned manner (e.g., overlapped, moved up, moved down) with a predetermined margin (e.g., several pixels) to generate the combined digital image samples. This embodiment allows to simulate a more realistic environment in order to enhance the detection efficiency of the real combined pattern.

Additionally, system 102 may verify other features than the anti-counterfeit patterns. These features include, but not limited to, a name, an address and so on. As a result, system 102 is enabled to provide a complete security check service on secure documents to users.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for authenticating a document comprising at least one line of anti-counterfeit patterns spaced from each other, the positions of the anti-counterfeit patterns being random, and a partial anti-counterfeit pattern being provided at an edge line of said document and being able to combine with another partial anti-counterfeit pattern provided at an opposite edge to form a compete anti-counterfeit pattern, the method comprising the following steps of:

receiving a digital image of said document, said digital image comprising said partial anti-counterfeit pattern in a first edge area corresponding to said edge line;

selecting said first edge area;

copy-pasting said first edge area adjacent to a second edge area of the digital image to generate a combined digital image, said second edge area being opposite to said first edge area, wherein content, which is comprised in said second edge area and located on a same line as said partial anti-counterfeit pattern, and said partial anti-counterfeit pattern jointly form a combined pattern;

authenticating said document by taking into account said combined pattern.

2. A method according to claim 1, wherein the method further comprises the following steps of:
applying a deep learning trained model to said combined digital image to detect real anti-counterfeit patterns from said combined pattern and other anti-counterfeit patterns present on said combined digital image;
authenticating said document to be real based on the detected real anti-counterfeit patterns.

3. A method according to claim 2, wherein the deep learning model is a You Only Look Once (YOLO) model.

4. A method according to claim 2, wherein the deep learning model is configured to perform the detection only once.

5. A method according to claim 2, wherein said deep learning model is trained by using multiple combined digital images of documents with a fault tolerance.

6. A method according to claim 2, wherein the method further comprises the following steps of:
detecting four classes of anti-counterfeit patterns: complete anti-counterfeit pattern, partial anti-counterfeit pattern, real combined pattern, false combined pattern;
authenticating said document to be real based on the number of said complete anti-counterfeit pattern and said real combined pattern.

7. A method according to claim 1, wherein if said document is real, the partial anti-counterfeit pattern provided at said edge line is adapted to combine with a partial anti-counterfeit pattern provided at an opposite edge of said document to jointly form a complete anti-counterfeit pattern.

8. A method according to claim 1, wherein the method further comprises verifying other data than the anti-counterfeit patterns on the digital image to provide a complete security check service.

9. A computer program, stored on a non-transitory computer-readable medium, comprising instructions for executing the steps of a method for authenticating a document comprising at least one line of anti-counterfeit patterns according to the method of claim 1 when said program is executed by a processor.

10. A system for authenticating a document comprising at least one line of anti-counterfeit patterns, the anti-counterfeit patterns of each line being spaced at a same interval, and a partial anti-counterfeit pattern being provided from an edge line of said document and being able to combine with another partial anti-counterfeit pattern provided at an opposite edge to form a complete anti-counterfeit pattern, the system comprising:
a memory unit for storing a computer program for authenticating a document comprising at least one line of anti-counterfeit patterns according to the method of claim 1; and
a processor coupled to the memory unit, where the processor is configured to execute program instructions of said computer program.

* * * * *